Oct. 2, 1934.  A. FORMHALS  1,975,504
PROCESS AND APPARATUS FOR PREPARING ARTIFICIAL THREADS
Original Filed Dec. 5, 1930  3 Sheets-Sheet 1
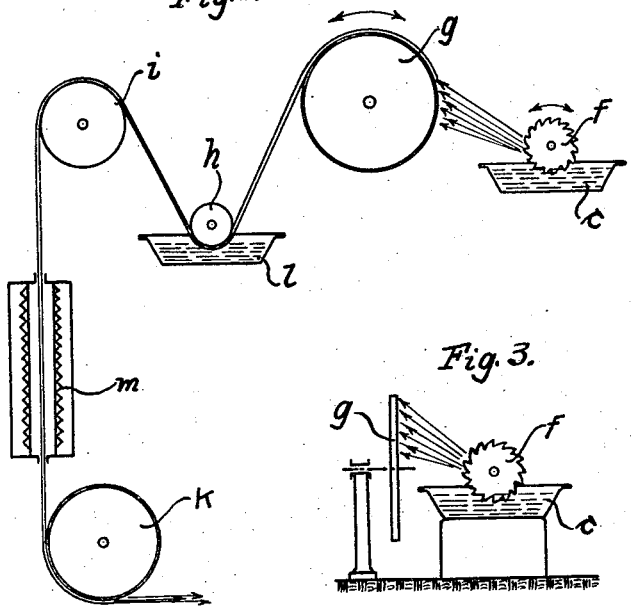
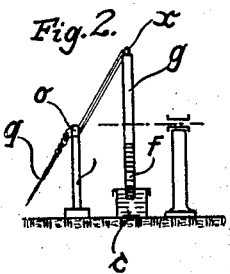
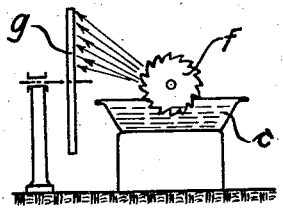
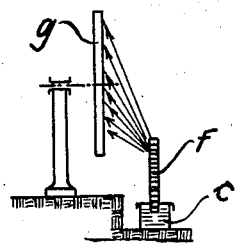
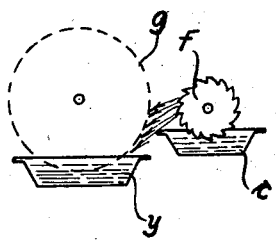

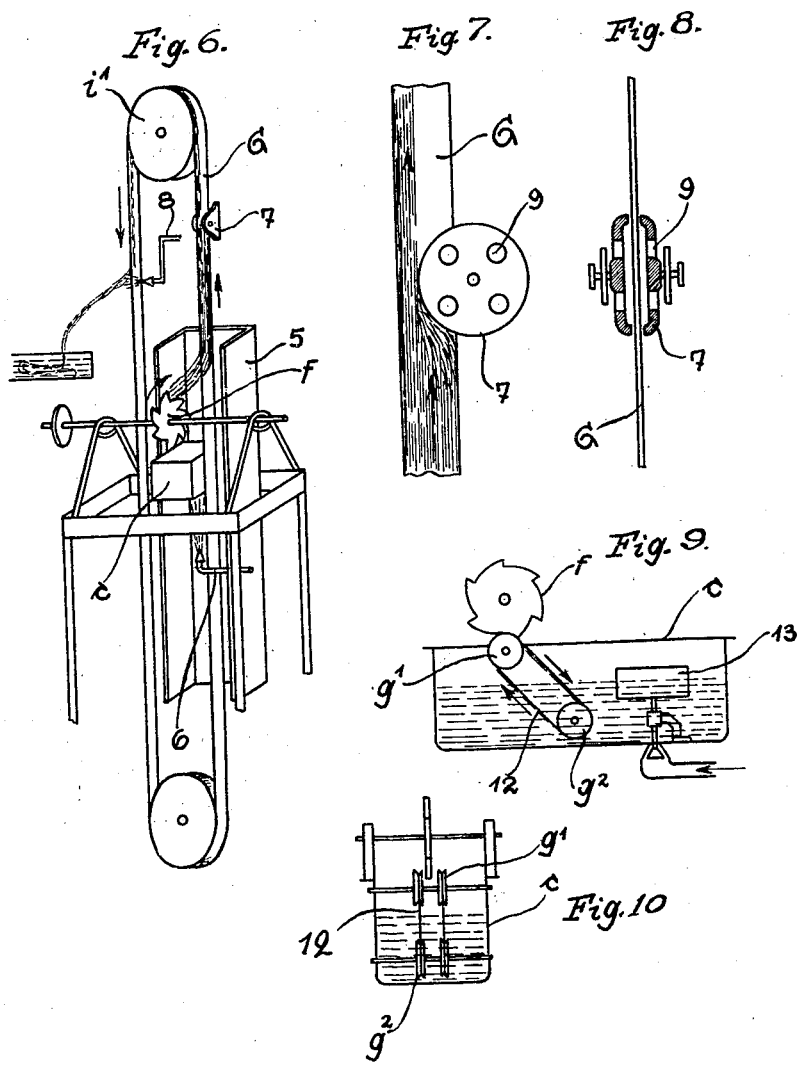

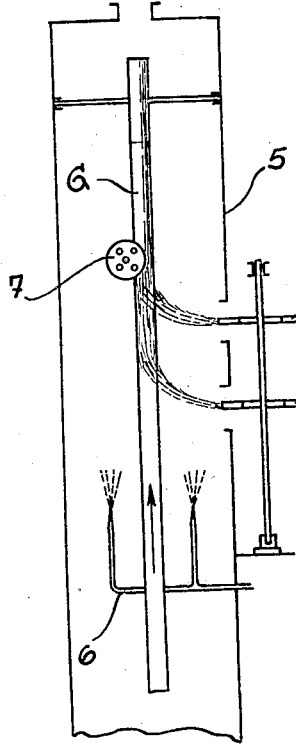
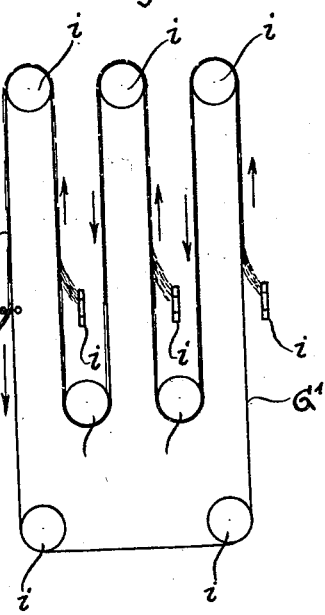

Patented Oct. 2, 1934

1,975,504

UNITED STATES PATENT OFFICE 1,975,504

PROCESS AND APPARATUS FOR PREPARING ARTIFICIAL THREADS

Anton Formhals, Mainz-on-the-Rhine, Germany, assignor, by mesne assignments, to Richard Schreiber-Gastell and to said Anton Formhals, Mainz, Germany Application December 5, 1930, Serial No. 500,283. Renewed March 23, 1934. In Germany December 7, 1929

9 Claims. (Cl. 18—8)

This invention relates to a process and an apparatus for the production of artificial filaments.

It is already known to make use of the action of an electrical field on liquids which contain solid materials dissolved in them with a view to forming threads for the production of silk-like spun fibres. For this purpose the solutions are passed into an electrical field formed between electrodes in a thin stream or in drops in order to separate them into a plurality of threads. This method which has been experimented upon for a long time has heretofore had no importance in the manufacture of artificial threads or the like of the kind which can be used for textiles, as it was practically impossible to remove the threads produced, in a form which would be of technical use, by means of the usual collecting devices, for instance a reel or the like, without a considerable proportion thereof being depreciated by flying off towards one of the fixed electrodes of the field.

It has now been found that this theoretically efficient method can actually be converted into one which is highly advantageous from a commercial stand-point, if a movable thread collecting device which supports the thread in a stretched condition, such as for instance a reel, spool or drum made of conducting material, is combined with the electrode which attracts the threads formed, in such a way that the movable thread collecting device itself exerts the attracting power for the threads. This has the astonishing result that the entangled threads which repel each other when spaced apart in the electrical field, pile up in parallelism on the thread receiving device in such a way that they can be unwound continuously in solid form in skeins or ropes of any desired strength.

The spinning solution, for instance a solution of cellulose derivatives, such as cellulose acetate, from which threads can be drawn, may be introduced into an electric field either in the known manner by means of a nozzle or by any other suitable device, which at the same time forms one pole of the electrodes which produce the field.

In order to produce the potentials necessary for carrying out the process, all known sources for the production of direct, alternating and multi-phase currents are suitable and both of the latter may be of any desired periodicity. Pulsating direct currents, obtained from alternating or multi-phase currents with the aid of rectifiers, may also be employed. When employing a direct current the result of the filament production is modified by reversing the current. The potential difference employed depends upon the properties of the spinning solution and may, for example, amount to about 5,000 to 10,000 volts or more or less.

The spinning solutions employed, for example solutions of cellulose esters, particularly cellulose acetate or solutions of mixed cellulose esters or mixtures of the same, can be treated with any desired admixtures, such as softening agents, etc. which have already been, or may yet be proved to be, advantageous for preparing the solutions for artificial filaments. Cellulose ester solutions which have been brought near the point of coagulation by the addition of precipitated liquids may also be employed.

As well as cellulose ester solutions, other cellulose derivatives, for example, cellulose ethers or cellulose itself, are suitable insofar as they can be employed in the described process.

Not only the known solutions of the cellulose esters and ethers in solvents or solvent mixtures of acetone, acetic ether, benzene, alcohol and the like are suitable for working up according to the present process, but especially also the solutions of the cellulose derivatives in the reaction media, for example in acetic acid or other fatty acids.

The new process is also in no way limited to spinning in the dry but is also suitable with all possible variations and by using any suitable precipitating bath for spinning in the wet. All the known procedures which relate to suitable precipitating baths and other compositions, such as in the nozzle-spinning process, may also be employed in this case. The solutions of cellulose or cellulose derivatives may be of any origin. Thus, for example, a cellulose ester solution, if desired cellulose acetate solution, prepared from wood cellulose and having a composition somewhat as follows, may be very advantageously used in the new spinning process:

11 gms. cellulose acetate.
1 gm. softening agent (Solactol and Palatinol).
44 gms. of chemically pure acetone.
44 gms. of alcohol.

This solution is allowed to stand for about one to two days or longer before being employed for the spinning process. It is spun at ordinary temperature.

Propionyl-cellulose solution can be spun as described above exactly like acetyl-cellulose solution and also with the same additions.

When employing the above-mentioned solutions, the potential difference is with advantage maintained at about 10,000 volts or more.

Rubber solutions can be spun in a similar manner.

When employing different spinning solutions, for example rubber or caoutchouc solutions on the one hand and solutions of cellulose derivatives or other substances on the other hand, mixed filaments or mixed filament structures are obtained which are suitable for many purposes.

In order that the invention may be better understood and readily carried into effect, certain embodiments of apparatus according thereto will now be described with reference to the accompanying drawings, wherein:

Fig. 1 is a diagrammatic front view of apparatus by means of which the spinning liquid is caused to disperse in an electrical field, Fig. 2 is a side view of similar apparatus but embodying a deflecting device for the threads, Figs. 3 and 4 are side views of apparatus in which the spinning wheel and thread receiving device are disposed with their axes at right angles and parallel to each other respectively, Fig. 5 shows a modification of the apparatus shown in Fig. 1 for wet spinning, Fig. 6 is a diagrammatic perspective view of another modification, a detail thereof being represented in Figs. 7 and 8 in front and side view respectively, Fig. 9 is a diagrammatic longitudinal section and Fig. 10 is a corresponding cross section of a part of the apparatus shown in Fig. 6, and Figs. 11 and 12 diagrammatically show two modifications of the apparatus.

Referring to Fig. 1, the apparatus comprises a vessel $c$ from which the spinning liquid is caused to disperse in an electrical field, the two electrodes which produce the field being two insulated bodies $g$ and $f$ rotating in the same or in opposite directions. The pole $f$ gives off the spinning solution and the pole $g$ attracts the threads and at the same time collects them. The pole $g$ is suitably a metal ring and the pole $f$ a serrated wheel. If now the two movable bodies, charged with high tension static electricity of unlike polarity, produced for instance by an influence machine, are caused to rotate, extremely fine threads are produced uninterruptedly from the points of the wheel $f$ in the direction of the metal ring $g$ where they are precipitated in heaps and lie longitudinally on its periphery, supporting themselves on the surface of the ring or against neighbouring threads in such a way that skeins of threads result which may be removed, spun and further worked up with great advantage for textile purposes.

Referring to Fig. 2, at the side of the rotating metal ring $g$ and opposite the axis of rotation of the same an opening $o$ is provided in a stand $p$, through which a fascine of threads removed from the rotating ring $g$ may be drawn and spun at the same time. This spinning occurs by reason of the fact that the wheel $g$ is rotating rapidly and that the opening $o$ is disposed axially opposite thereto.

With the device according to Fig. 2, the operation is effected as follows:—The serrated wheel $f$ and the receiving ring $g$ are first caused to rotate and a suitable difference of potential is produced between the same. As a consequence of this the ring $g$ becomes covered with artificial threads which dispose themselves in heaps on its periphery. This process may be broadly designated as spinning. This has to be followed by a process which may be more narrowly defined as a spinning process proper. It corresponds to the action, which is carried out by means of a spinning wheel, of forming a continual yarn from individual, regularly arranged pieces of thread. For this purpose the serrated wheel $f$ and the receiving ring $g$ are first stopped. One end of the heap of threads disposed on the ring $g$ is detached and secured to the end of a string or cord, the opposite end of which is drawn through the eye $o$ and fastened near the circumference of a reel (not shown). The ring $g$ is then set rotating again, as is also the last mentioned reel. The loose end of the heap of threads on the wheel $g$ is continuously drawn off by the pull exerted on the latter. Owing to the fact that the wheel $g$ rotates and the threads drawn off pass through the stationary eye $o$, the twist is imparted to the threads corresponding to the twist of the threads on a hemp rope. The serrated wheel $f$ is then again set in motion, and the ring $g$ is covered and spun around at the same rate as fascines of threads are drawn off the same through the eye $o$.

This method can, as will be seen in Fig. 1, be combined with a thread washing device $h$ and $l$, as well as with thread drying and stretching devices $m$ and $k$ in which the condition of the bundles or fascines of threads removed from the wheel $g$ can be further improved.

It is not necessary to arrange the rotating bodies $g$ and $f$ behind one another in such a way that their axes of rotation are parallel. The axes of rotation may be placed in any desired position relative to one another, for example as shown in Figs. 3 and 4, so that they are displaced upwardly or downwardly relatively to one another as desired. In Figs. 3 and 4 the wheels $g$ and $f$ are axially at right angles and parallel to one another respectively. Here also the surprising result is obtained that the threads lie on the metal ring $g$ arranged side by side as soon as spinning is started According to Fig. 5, wet spinning may also be effected by using a liquid of any kind contained in the container $y$ serving as a precipitating bath. A receiving wheel $g$, indicated in broken lines, rotates in the container $y$, whereby the filaments collect on $g$ and are moved through the precipitating bath.

Between the spur wheel and the receiving member $g$, cold is produced by evaporation, which can be removed by a suitable heating device, for example an upward flowing current of hot air, whereby the coagulation of the filaments is at the same time accelerated. This cold zone, as well as the heating device may be partially disposed, if desired together with the receptional wheel $g$ in a container. The movement of the hot air may also take place in the direction of the filaments formed. Similarly the spinning process may be carried out in a chamber, which is under pressure or partially evacuated. The filament forming atmosphere can also either consist of air or any other gas, or also of suitable vapours or vapour mixtures, which may be neutral, acid or basic, and by means of which the cold produced by evaporation can, if desired, be diminished or removed, and the coagulation process of the filaments be accelerated.

A further modification of the apparatus according to Fig. 1 is shown in Figs. 6 to 10. In this case the spinning device consists of a rotatable spur wheel $f$, the teeth of which dip into the spinning solution in the container $c$ or have the spray solution conveyed to them. In place of the receiving wheel $g$ previously described with reference to Fig. 1 an endless steel or similar band G passing over two rollers is employed, which is continuously conveyed round the rollers at a suitable distance from the spur wheel *f*.

The spur wheel *f* is with advantage disposed in front of or inside a channel or casing 5 into which hot air currents or the like can be passed upwards through a conduit 6.

The band G passes through the channel 5, if necessary through a sliding member 7, which overlaps the same on both sides up to about three quarters of its width, and forces the spun filaments heaped on the same to one of its edges. On the other side the metal band passes at any convenient position, for example at 8, through a device for the purpose of loosening the spun filaments collected on the metal band and allowing them to become free therefrom.

This apparatus operates as follows:

As soon as the spinning wheel *f*, as well as the band G, between which there is a difference of potential, are set in motion in the direction of the arrows a vigorous spraying of filaments commences from the teeth of the wheel *f* towards the metal band. The device 7 overlapping the latter for about three quarters of its width, and which consists of elastic rubber discs or the like pressing against the metal band pushes the filaments collected on the band on to one side, so that they form a bundle of filaments at the edge of the band. As soon as this compressed bundle of filaments adhering to the front edge of the band has passed the upper roller $i^1$, it is blown off or otherwise removed to one side of the edge of the band by the device 8, which preferably comprises two compressed air nozzles disposed one on each side of the surface of the band, and thus forms a transportable filament freely suspended in the air which can be further treated in the manner described with reference to Fig. 2.

The device 7 is illustrated to a somewhat enlarged scale in Figs. 7 and 8. It consists of two hollow elastic discs, which press against the metal band and which are either stationary or rotatable and are provided with holes 9. These discs are disposed edge-wise on both sides of and adjacent to the metal band G so as to cover three quarters or more of the surface width and, as shown in Fig. 7, force the filaments, as they mount upwards, towards the front edge of the metal band and then combine them into the aforesaid skein. The holes 9 serve the purpose of providing an exit for any filament residue, which may have collected in the hollow space.

Figs. 9 and 10 show the vessel $c^1$ containing the spinning solution and the spur wheel *f* disposed above the same, also on a somewhat enlarged scale. In order to ensure as uniform a feed of the spinning solution on to the spur wheel as possible during continuous operation, two rollers $g^1$ and $g^2$ are disposed beneath the spur wheel, the lower of which lies in the spinning solution. These are so connected by means of the transmission belt or belts 12, that on rotation of the rollers $g^1$ and $g^2$ spinning liquid is drawn upwards by the belt and fed on to the teeth of the wheel *f*. The surface level of the spinning liquid can be continuously kept at the same level in the container *c* by means of a gauge 13. The apparatus is shown in cross section in Fig. 10 with rollers $g^1$ and $g^2$ and belts 12 disposed on either side of the spinning wheel.

The apparatus according to Figs. 6, 7 and 8 is only an example and can, therefore, be modified in all its parts in any desired manner as may be found to be expedient. Thus, for example, the spur wheel *f* need not necessarily be vertically disposed in relation to that part of the metal band which takes up the filaments, but can also be disposed at any desired angle or absolutely horizontal, if desired in any frontal or inclined position with respect to the metal band.

Thus, for example Fig. 11 shows in side elevation the metal band enclosed in a casing 5, where the band G passes up and down in a vertical direction, whilst the spur wheel *f*, of which there may be a plurality, if desired, disposed one above the other, are horizontally disposed opposite to the vertical metal band. With this arrangement also, hot air currents or suitable gases, having particular properties, may be passed up the casing and, if desired, be also withdrawn at the top. This apparatus can also be employed for intercepting and recovering the solvent vapours of the spinning solution. The apparatus shown in Fig. 6 can also be suitably enclosed for the above-mentioned purpose.

In order to make the spinning process as continuous and undisturbed as possible the metal band may also travel in any desired directions other than that shown in Fig. 6. Thus, for example, the path of the band $G^1$ (Fig. 12) can be so arranged that the latter passes, either in a vertical or horizontal position, over a system of rollers *i* with two or more reversals in direction, whereby spinning can be effected from various wheels *f*. Such an arrangement has the advantage that it is not necessary at the beginning of the spinning process to wait until the skein of filaments is strong enough to be removed, but that at the commencement a sufficiently strong skein can be immediately blown off or otherwise removed from the metal band $G^1$.

It has already been shown in Fig. 1 that the skeins of filament formed on the disc *g* and removed from the same are first passed over a roller *h* and through a bath of liquid *l* and then further conveyed over a drum *i* and through a heating device on to a roller or stretching device *k*. It has been found to be especially advantageous, particularly when employing spinning solutions, the filaments from which have to be subjected to a washing process, to make this washing process more effective by as long an immersion in the washing liquid as possible. For this purpose the skein or fascine of filaments can be conveyed through a longer distance, if desired by way of a zig-zag path, through the bath of liquid, before being passed into the heating chamber *m* or the like.

It has, however, also been found that it is very advantageous to subject the washed fascine of filaments whilst still wet to a hot stretching process. In this way, particularly strong shining filaments are obtained, especially if when spinning cellulose derivatives, for example, cellulose acetate, the solutions in the reaction media, for example in acetic acid or other fatty acids, directly obtained from the process of esterification, are employed as starting material. The washing process in this case has the advantage that the skein or fascine of filaments is to a very great extent or completely freed from the acid esters, residues of catalysts and the like and their conversion products.

The sliding member 7 shown in Figs. 7 and 8 need not necessarily be present. If desired there may be in its place the device 8 of Fig. 6 or any other device, which fulfills the same purpose, so that the filaments can be blown off or otherwise removed from the metal band before it passes over the upper guiding roller.

When using the arrangement shown in Figs. 9 and 10 it is possible, in place of the conveying device $g^1$, $g^2$ and 12, to employ a single rotating roller or cylinder, the periphery of which dips into the spinning liquid and conveys the drops of liquid to the rotating spinning wheel.

The filaments obtained according to the new process are not separate and individual filaments but are in the form of a bundle or fascine of filaments after the nature of cotton and can be worked up in a similar manner.

It has been found that acetyl cellulose especially or acetyl cellulose containing solutions can be used with advantage for the manufacture of artificial fibres according to the process claimed by reason of their low inflammability. The use of such solutions has at the same time the advantage that spinning under high potential differences can be carried out without danger, as the thread material resulting from such solutions only possesses small combustibility.

What I claim is:—

1. An apparatus for producing artificial filaments from a solution containing filament forming substances, including a pair of spaced electrodes, one of said electrodes including a movable filament collecting device, and means disposed near the other electrode for introducing the solution into the electrical field created between said electrodes.

2. An apparatus for producing artificial filaments from a solution containing filament forming substances, including a pair of spaced electrodes, one of said electrodes including a rotatable wheel adapted to collect filaments on the periphery thereof, and means disposed near the other electrode for introducing the solution into the electrical field created between said electrodes.

3. An apparatus for producing artificial filaments from a solution containing filament forming substances, including a pair of spaced electrodes, one of said electrodes including a movable filament collecting device, the other electrode including a toothed rotatable wheel adapted for feeding solution into the electrical field created between said electrodes to form filaments.

4. An apparatus for producing artificial filaments from a solution containing filament forming substances, including a pair of spaced electrodes, forming an electrical field therebetween, one of said electrodes including a rotatable toothed wheel, the other electrode being movable for collecting the formed filaments thereon and under tension, said toothed wheel serving for feeding solution into the electrical field when said wheel is rotated.

5. An apparatus for producing artificial filaments from a solution containing filament forming substances, including a pair of interspaced electrodes forming an electrical field therebetween, one of said electrodes being in the form of an endless movable belt, and means for projecting the solution from the other electrode into the electrical field created between said electrodes, whereby filaments are formed in said field and collected on said belt.

6. An apparatus for producing artificial filaments from a solution containing filament forming substances, including a pair of spaced electrodes, one of said electrodes being in the form of an endless belt, means for projecting liquid from the other electrode into the electrical field created between said electrodes, whereby filaments are formed in said field and collected on said belt, and means for shifting the filaments collected on said belt together to bunch said filaments.

7. An apparatus for producing artificial filaments from a solution containing filament forming substances, including a pair of spaced electrodes, one in the form of a rotatable toothed wheel, means for feeding solution to the teeth of said wheel, whereby the solution is introduced into the electrical field from said wheel when rotated, and the other electrode being in the form of an endless belt, whereby the electrical dispersion tension is created between said electrodes and the filaments formed in the field are collected on said endless belt.

8. An apparatus for producing artificial filaments from a solution containing filament forming substances, including a pair of spaced electrodes, one of said electrodes comprising a movable filament collecting device adapted to support said filaments in stretched condition, means for projecting solution from the other electrode into the electrical field created between said electrodes, and means for delivering a current of hot air in said electrical field.

9. A process for producing artificial filaments from a solution containing filament forming substances, including the steps of creating between a pair of spaced electrodes an electrical field having liquid dispersing properties, projecting the solution in said field from one of said electrodes to subject said solution to an electrical dispersing tension, whereby filaments are formed therefrom, collecting said filaments on the other electrode, and supporting the filaments in stretched condition thereon.

ANTON FORMHALS.